(12) United States Patent
Sibbach et al.

(10) Patent No.: US 12,448,891 B2
(45) Date of Patent: Oct. 21, 2025

(54) TURBINE ENGINE AIRFOIL WITH A WOVEN CORE

(71) Applicant: GENERAL ELECTRIC COMPANY, Schenectady, NY (US)

(72) Inventors: Arthur William Sibbach, Boxford, MA (US); Elzbieta Kryj-Kos, Liberty Township, OH (US); Michael John Franks, Cincinnati, OH (US); Nicholas Joseph Kray, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/182,559

(22) Filed: Mar. 13, 2023

(65) Prior Publication Data

US 2024/0309763 A1    Sep. 19, 2024

(51) Int. Cl.
*F01D 5/14*     (2006.01)
*F01D 5/28*     (2006.01)

(52) U.S. Cl.
CPC .............. *F01D 5/147* (2013.01); *F01D 5/288* (2013.01); *F05D 2220/36* (2013.01); *F05D 2300/6034* (2013.01)

(58) Field of Classification Search
CPC . F01D 5/147; F01D 5/28; F01D 5/282; F01D 5/288; F05D 2220/36; F05D 2250/20
See application file for complete search history.

(56) References Cited

U.S. PATENT DOCUMENTS

| | | | |
|---|---|---|---|
| 3,368,795 A * | 2/1968 | Bolin | F01D 5/282 |
| | | | 416/241 A |
| 4,111,606 A * | 9/1978 | Prewo | C22C 47/068 |
| | | | 416/241 A |
| 5,279,892 A | 1/1994 | Baldwin et al. | |
| 6,607,358 B2 | 8/2003 | Finn et al. | |
| 6,709,230 B2 * | 3/2004 | Morrison | F01D 5/282 |
| | | | 416/241 B |
| 7,247,002 B2 | 7/2007 | Albrecht et al. | |
| 7,354,651 B2 * | 4/2008 | Hazel | C23C 28/321 |
| | | | 428/641 |
| 7,374,404 B2 | 5/2008 | Schilling | |
| 7,581,932 B2 | 9/2009 | Coupe et al. | |
| 8,105,042 B2 | 1/2012 | Parkin et al. | |
| 8,696,319 B2 | 4/2014 | Naik | |
| 9,045,991 B2 | 6/2015 | Read et al. | |
| 10,927,677 B2 | 2/2021 | Senile et al. | |
| 2012/0134839 A1 * | 5/2012 | Parkin | F01D 5/147 |
| | | | 416/230 |
| 2013/0029117 A1 * | 1/2013 | Read | F01D 5/28 |
| | | | 156/308.2 |

(Continued)

*Primary Examiner* — Courtney D Heinle
*Assistant Examiner* — Cameron A Corday
(74) *Attorney, Agent, or Firm* — McGarry Bair PC

(57) ABSTRACT

A gas turbine engine includes a fan section, a compressor section, combustor section, and turbine section in serial flow arrangement, and defining an engine longitudinal axis. Sets of blades can be rotatably driven about the longitudinal axis in the fan section, the compressor section, and the turbine section. The airfoil structure defining one or more of the blades or vanes can include a structure which includes a woven or foam core, with a laminate skin, and an exterior coating.

18 Claims, 9 Drawing Sheets

(56) References Cited

U.S. PATENT DOCUMENTS

| | | | |
|---|---|---|---|
| 2013/0210299 A1* | 8/2013 | Zhang | C23C 28/345 |
| | | | 156/280 |
| 2014/0193270 A1 | 7/2014 | Plunkett et al. | |
| 2016/0160658 A1* | 6/2016 | McCaffrey | F01D 5/282 |
| | | | 29/889.71 |
| 2018/0312976 A1* | 11/2018 | Wiley | C23C 28/02 |
| 2022/0161520 A1 | 5/2022 | Sibbach et al. | |

\* cited by examiner

TURBINE ENGINE AIRFOIL WITH A WOVEN CORE

TECHNICAL FIELD

The present disclosure relates generally to a core for a component of a gas turbine, and more specifically to an airfoil having a woven core geometry.

BACKGROUND

A turbine engine typically includes an engine core with a compressor section, a combustor section, and a turbine section in serial flow arrangement. A fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

Forming engine components is commonly achieved by casting. Casting is a common manufacturing technique for forming various components of a gas turbine aviation engine. Casting a component involves a mold having a void in the form of a negative of the desired component shape, filling the void with a flowable material, letting the material harden, and removing the mold.

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
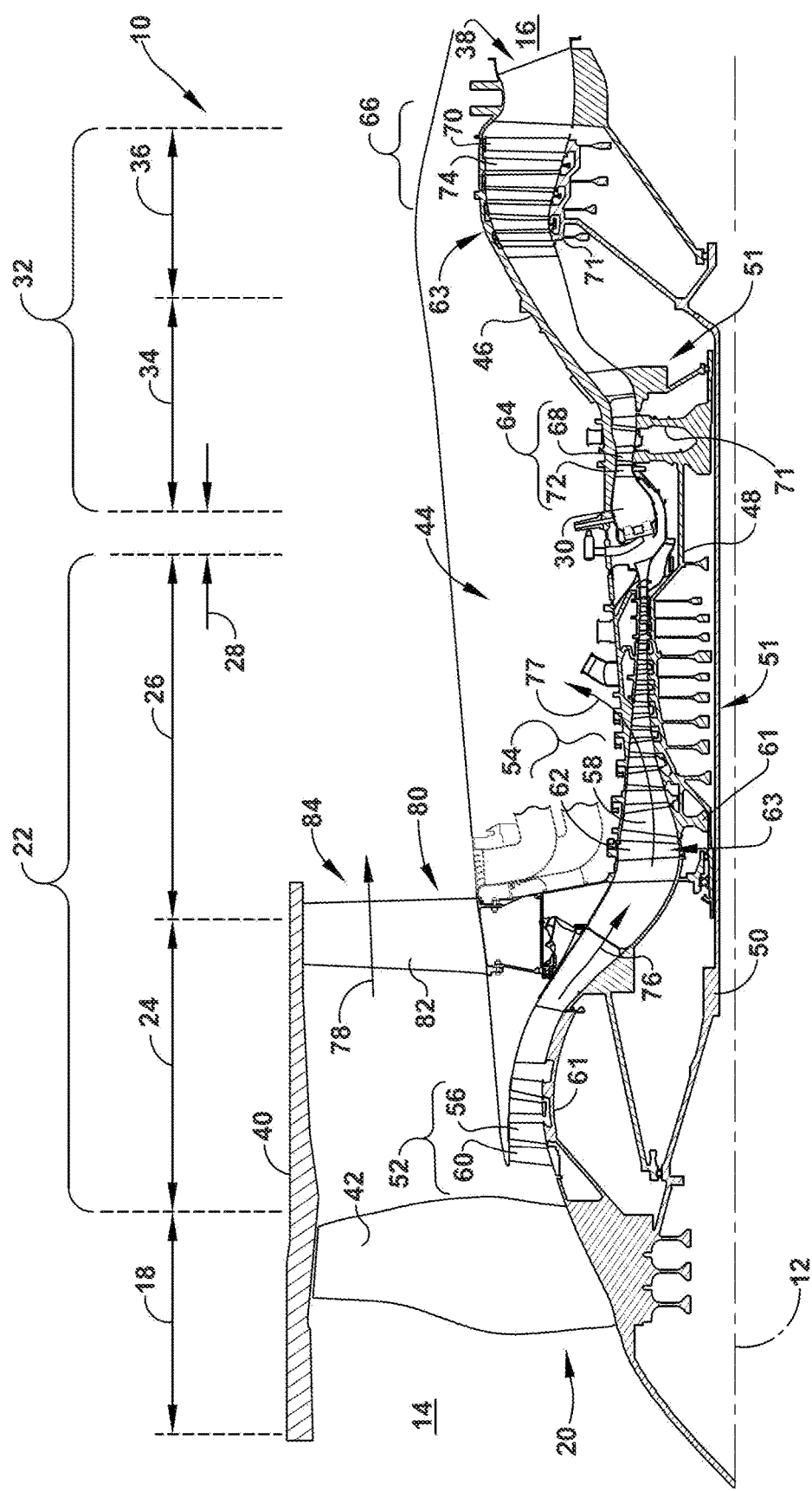
FIG. 1 is a schematic cross-sectional view of a turbine engine in accordance with an exemplary embodiment of the present disclosure.

Aspects of the disclosure herein are directed to a manufactured core used for an engine component, such as an airfoil. The core includes a woven core, and can include additional woven layers forming the engine component. The woven core is used to create an engine component for a turbine engine. Such an engine component can be an airfoil, for example. It should be understood, however, that the disclosure applies to other engine components of the turbine engine, not just an airfoil, such as a disk or combustor liner, in non-limiting examples. Further, while described in terms of a core used in the manufacture of an airfoil, it will be appreciated that the present disclosure is applied to any other suitable environment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something. For example, when used in terms of fluid flow, fore/forward can mean upstream and aft/rearward can mean downstream.

The term "fluid" may be a gas or a liquid, or multi-phase.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) as may be used herein are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

As used herein, the term "exterior" or "exteriorly" refers to an exterior position or location relative to a common interior or center. For example, as used herein, "located exteriorly" can refer to a location further from a core, relative to another aspect.

As used herein, the term "stiffness" may be used as defining the extent to which a structure resists deformation in response to force. Stiffness can be defined as the ratio of force to displacement of the object under said force. Stiffness can include resisting deformation in response to force applied from various directionalities, whereby the stiffness can represent an axial stiffness, tensile stiffness, compression stiffness, torsional stiffness, or shear stiffness in non-limiting examples.

As used herein, the term "elasticity" may be used as defining the modulus of elasticity (Young's modulus) under tension or compression, can may relate to an elasticity for a particular material or structure made of such material, such as the engine components described herein. The elasticity can represent the stress per unit area relative to the local strain or proportional deformation thereof.

The term "composite," as used herein is, is indicative of a component having two or more materials A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The inventors' practice has proceeded in the foregoing manner of designing a core used in the manufacture of a component such as an airfoil, designing the airfoil to have improved stiffness transition between the core and an exterior skin, decreased weight, identifying whether or not the component was manufactured as designed and satisfies component objectives, and modifying the engine component with new geometric characteristics of the cast engine. This process is repeated during the design of several different types of components, such as those shown in FIG. 1.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the greater diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor 30.

A remaining portion of the airflow bypasses the LP compressor 24 and engine core 44 as a bypass airflow 78, and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
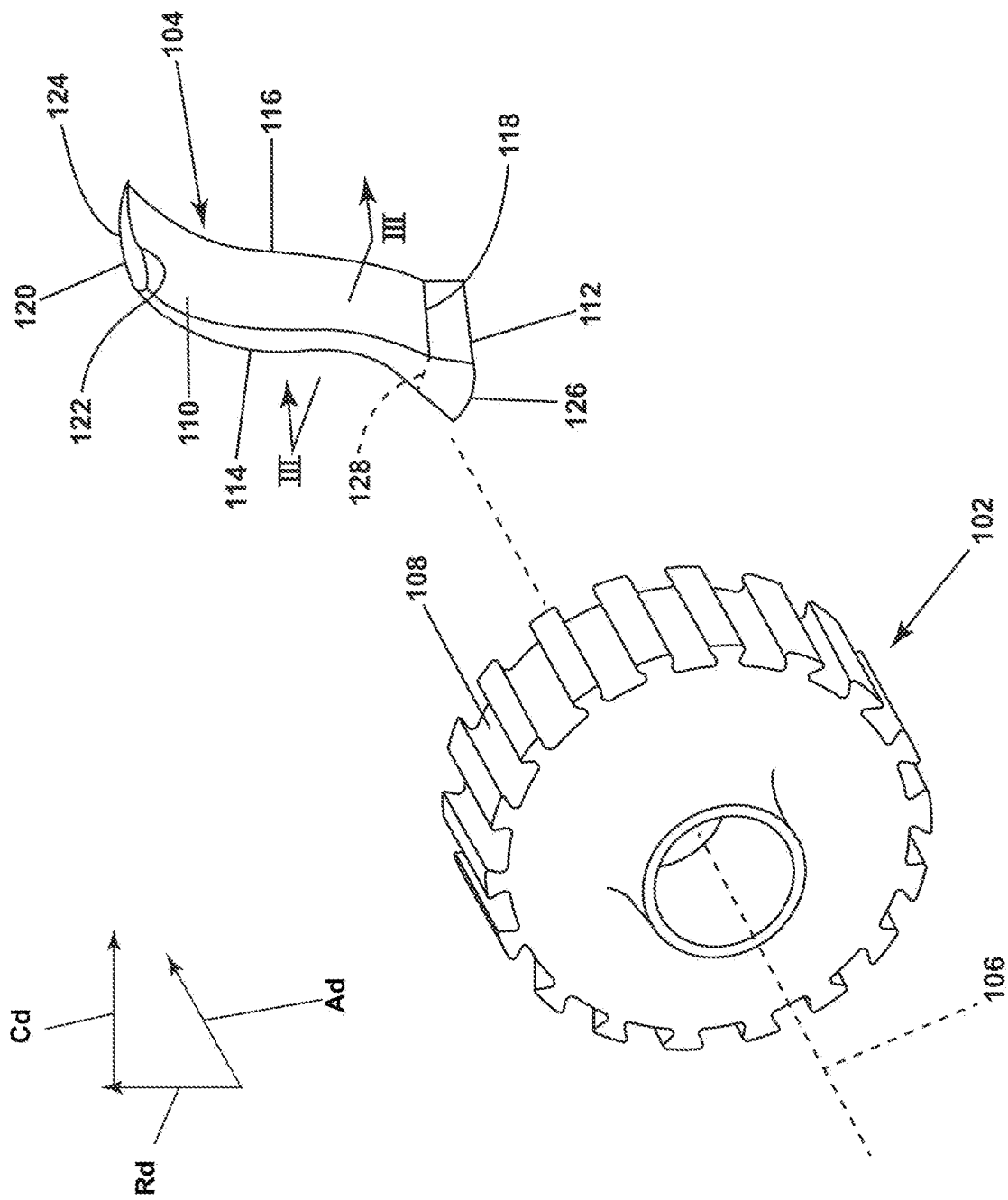
FIG. 2 is a schematic perspective view of a composite airfoil assembly and disk assembly suitable for use within the turbine engine of FIG. 1, the composite blade assembly including an airfoil and a dovetail, in accordance with an exemplary embodiment of the present disclosure.

FIG. 2 is a schematic perspective view of a composite airfoil assembly 104 and a disk assembly 102 suitable for use within the turbine engine 10 of FIG. 1. The disk assembly 102 is suitable for use as the disk 61, 71 (FIG. 1) or any other disk such as, but not limited to, a disk within the fan section 18, the compressor section 22, or the turbine section 32 of the turbine engine 10. The composite airfoil assembly 104 can be rotating or non-rotating such that the composite airfoil assembly 104 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil assembly 104 can be a composite fan blade assembly.

The disk assembly 102 can be rotatable or stationary about a rotational axis 106. The rotational axis 106 can coincide with or be offset from the engine centerline (e.g., the engine centerline 12 of FIG. 1). The disk assembly 102 includes a plurality of slots 108 extending axially through a radially outer portion of the disk assembly 102 and being circumferentially spaced about the disk assembly 102, with respect to the rotational axis 106.

The composite airfoil assembly 104 includes an airfoil portion 110 and a dovetail portion 112 extending from the airfoil portion 110. The airfoil portion 110 extends between a leading edge 114 and a trailing edge 116 to define a chord-wise direction. The airfoil portion 110 extends between a root 118 and a tip 120 to define a span-wise direction. The airfoil portion 110 includes a pressure side 122 and a suction side 124. The dovetail portion 112 extends between a first end 126 and a second end 128 in the span-wise direction. The first end 126 is radially spaced inwardly from the second end 128, with respect to the rotational axis 106. The first end 126 defines a radial inner surface of the dovetail portion 112. The second end 128 denotes a transition between the dovetail portion 112 and the airfoil portion 110. As a non-limiting example, the second end 128 coincides with the root 118 of the airfoil portion 110. The dovetail portion 112 and the airfoil portion 110 can be integrally or non-integrally formed with each other.

The composite airfoil assembly 104 is coupled to the disk assembly 102 by inserting at least a portion of the dovetail portion 112 into a respective slot of the plurality of slots 108. The composite airfoil assembly 104 is held in place by frictional contact with the slot 108 or can be coupled to the slot 108 via any suitable coupling method such as, but not limited to, welding, adhesion, fastening, or the like. While only a single composite airfoil assembly 104 is illustrated, it will be appreciated that there can be any number of composite airfoils assemblies 104 coupled to the disk assembly 102. As a non-limiting example, there can be a plurality of composite airfoil assemblies 104 corresponding to a total number of slots of the plurality of slots 108.

For the sake of reference, a set of relative reference directions, along with a coordinate system can be applied to the composite airfoil assembly 104. An axial direction (Ad), can extend from forward to aft and is shown extending at least partially into the page. The axial direction (Ad) and can be arranged parallel to the rotational axis 106. A radial direction (Rd) extends perpendicular to the axial direction (Ad), and can extend perpendicular to the engine centerline 12. A circumferential direction (Cd) can be defined perpendicular to the radial direction (Rd), and can be defined along the circumference of the turbine engine 10 (FIG. 1) relative to the engine centerline 12 (FIG. 1).

Figure 3:
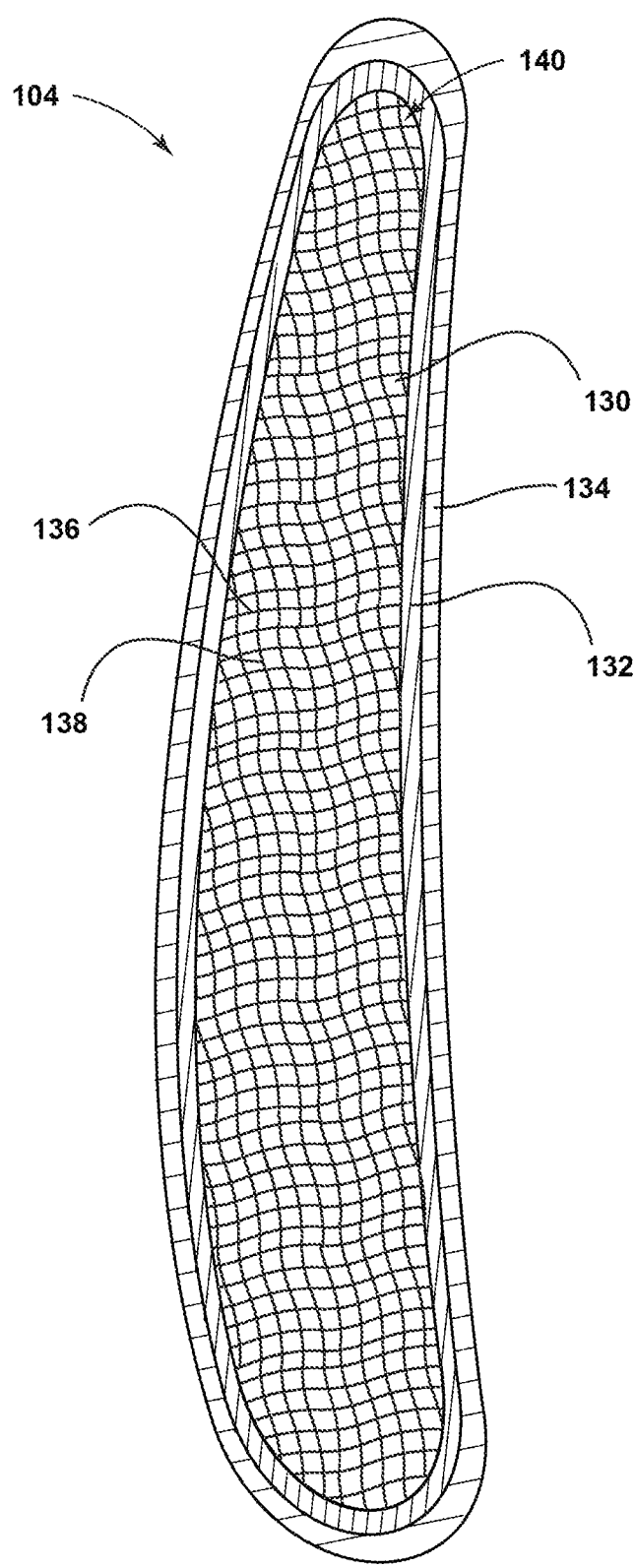
FIG. 3 is a schematic cross-sectional view taken along line III-III of FIG. 2 showing an interior of the composite airfoil assembly, including a woven core and a laminate skin on the woven core, in accordance with an exemplary embodiment of the present disclosure.

FIG. 3 shows a cross-sectional view of the composite airfoil assembly 104 of FIG. 2, taken along section III-III, illustrating an interior 140 of the composite airfoil assembly 104. The composite airfoil assembly 104 includes a woven core 130, a laminate skin 132 provided over the woven core 130, and a coating 134 provided over the laminate skin 132. The woven core 130 can include a first stiffness and a first elasticity.

The woven core 130 can be dry, with no additional materials, or alternatively, be impregnated with a resin and cured in one non-limiting example. The woven core 130 can made of a woven structure. Such a woven structure can be a three-dimensional woven structure. More specifically, the woven structure can be woven in a combination of the axial direction Ad, the radial direction Rd, and the circumferential direction Cd (FIG. 2), while it should be appreciated that the weave pattern can be formed and defined separate from the turbine engine 10 (FIG. 1), such that the weave pattern is woven in any three, mutually-orthogonal planes in order to define a three-dimensional object relative to said planes. In one non-limiting example, the woven structure can include a three-dimensional weaving including a plurality of warp fibers 136 and weft fibers 138 which can be woven in three directions to form a three-dimensional structure for the woven core 130. The three directions for the warp fibers 136 and weft fibers 138 can be defined along or angled relative to the axial direction Ad, the radial direction Rd, and the circumferential direction Cd. In one non-limiting example, a Jacquard loom, or 3D weaving machine can be used to create complex three-dimensional woven structures, which can include interweaving one or more composites to form the woven core 130. The woven core 130 can be comprised of composite materials, such as carbon or carbon fibers, glass or glass fibers, nylon, rayon, or other aramid fibers, while other materials such as nickel, titanium, or ceramic composites are contemplated in non-limiting examples.

It is further contemplated that the woven core 130 can be formed as a three-dimensional woven structure, having a braided or a plaited geometry or pattern. A braided or a plaited geometry or pattern can include a weave pattern that includes three or more interlaced fibers that are woven in a repeating pattern, for example. In another non-limiting example, the braided geometry can include a set of fibers or strands that are sequentially laid over one another to define the braided geometry. The woven or braided geometry or pattern can repeat for the entirety of the woven core 130, or only a portion thereof. Such additional braided geometries can be similar, where the arrangement of the fibers is the same, but the orientation is different, or where the arrangement of the fibers is different, and the orientation can be similar or dissimilar. The braided geometry or pattern can be formed with a Jacquard loom or 3D weaving machine with composite materials. A three-dimensional braided structure can include a braided pattern that extends in three dimensions, such as a combination of the axial direction Ad, the radial direction Rd, and the circumferential direction Cd.

The laminate skin 132 can be formed as a set of laminate layers, provided around or about the woven core 130. The laminate skin 132 can be pre-impregnated, fiber placed, or dry fiber laminate layers, in non-limiting examples. Such laminate layers forming the laminate skin 132 can be formed by resin transfer molding (RTM), partial RTM, same qualified resin transfer molding (SQRTM), or out-of-autoclave in non-limiting examples. The laminate skin 132 can include a second stiffness and a second elasticity. In one example, the second stiffness and the second elasticity can be greater than that of the first stiffness or the first elasticity of the woven core 130.

The coating 134 can be applied directly onto the laminate skin 132, while it is contemplated that an intermediate adhesive layer is provided between the laminate skin 132 and the coating 134. The coating 134 can cover the entirety of the laminate skin 132, or only a portion thereof. It is further contemplated that the coating 134 can be provided on the woven core 130 where portions of the woven core 130 are uncovered by the intermediate laminate skin 132. The coating 134 can include a third stiffness and third elasticity. The third stiffness and third elasticity can be greater than that of the second stiffness and the second elasticity of the laminate skin 132.

Additionally, the coating 134 can be an environmental barrier coating, for example, which can be used to resist oxidization or corrosion. In another example, the coating 134 can be a thermal barrier coating, at least partially thermally insulating the woven core 130 and laminate skin 132. Additional non-limiting examples coatings 134 can include an anti-ice coating such as polyurethane, ice-phobic materials, an ultraviolet radiation coating, or an oil barrier coating such as polyethylene or polypropylene. In one additional non-limiting example, the coating 134 an be formed as a polypropylene base layer and a polyurethane layer provided on the polypropylene base layer. It is further contemplated that an exterior paint layer (not shown) may be provided on the exterior of the coating 134, where such a paint layer may provide radiation protection, such as ultraviolet radiation.

During manufacture, the woven core 130 can be formed defining a specific woven structure. The specific woven structure can be a preform, specified to have a predetermined geometry, or can be cut or otherwise sized and shaped after manufacture of the woven structure, such as by cutting or grinding the woven core 130. The laminate skin 132 can be applied directly onto the woven core 130, or alternatively, it is contemplated that an adhesive material or other layer is provided therebetween. The woven structure of the woven core 130 provides for greater adhesion to the laminate skin 132, as opposed to the adhesion between the laminate skin 132 and a non-woven core, and can provide for improved stiffness transition or elasticity transition between the woven core 130 and the coating 134, whereby the difference in stiffness or elasticity between adjacent materials is less than that compared to non-adjacent materials, or an airfoil having a non-woven core.

Furthermore, the woven core 130, or other woven feature, can aid in facilitating handling of a dry preform, before being injected with an interior resin or other material, which would otherwise require careful handling, thereby decreasing cost and complexity of the manufacture and formation process.

Figure 4:
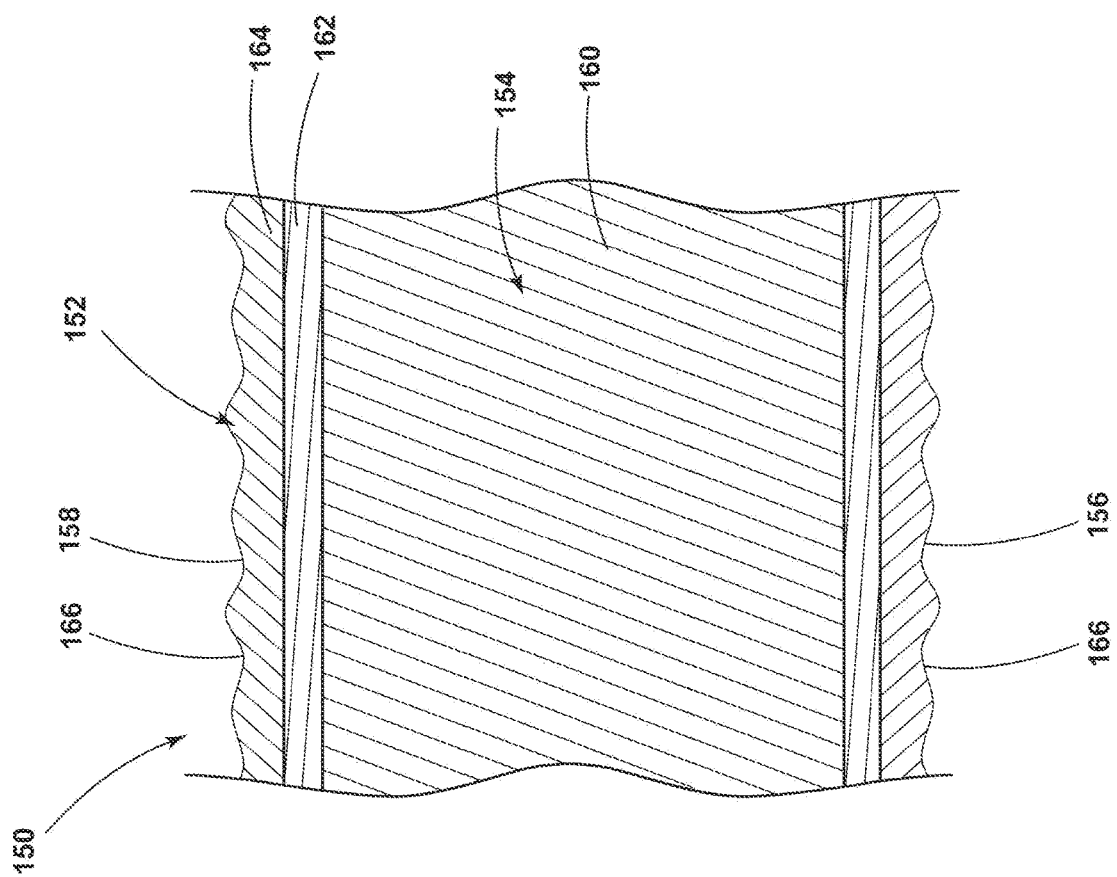
FIG. 4 is an enlarged view of a portion of the airfoil of FIG. 3, in accordance with an exemplary embodiment of the present disclosure.

FIG. 4 shows a portion of a sectional view of another airfoil 150. The airfoil 150 includes an outer wall 152 defining an interior 154, and including a pressure side 156 and a suction side 158. The interior 154 includes a core 160, which can be a woven core, a woven braided core, or a foam core in non-limiting examples. A laminate skin 162 can be provided over the core 160. The laminate skin 162 can surround the core 160, and can partially or wholly cover the core 160. A coating 164 can be provided on the laminate skin 162. The coating 164 can be resistant to water or ice, such as a hydrophobic or ice-phobic coating. Additionally, it is contemplated that the coating 164 can be textured, having a non-flat or non-planar texture 166 defined in three dimensions. Such a non-planar texture 166 can provide for increased resistance to ice formation, for example. Furthermore, the textured structure can be used to increase or otherwise vary the stiffness defined for the coating 164, which can be used to create a stronger exterior surface for the airfoil 150 while providing for improved stiffness transition utilizing the laminate skin between the coating 164 and the core 160.

Figure 5:
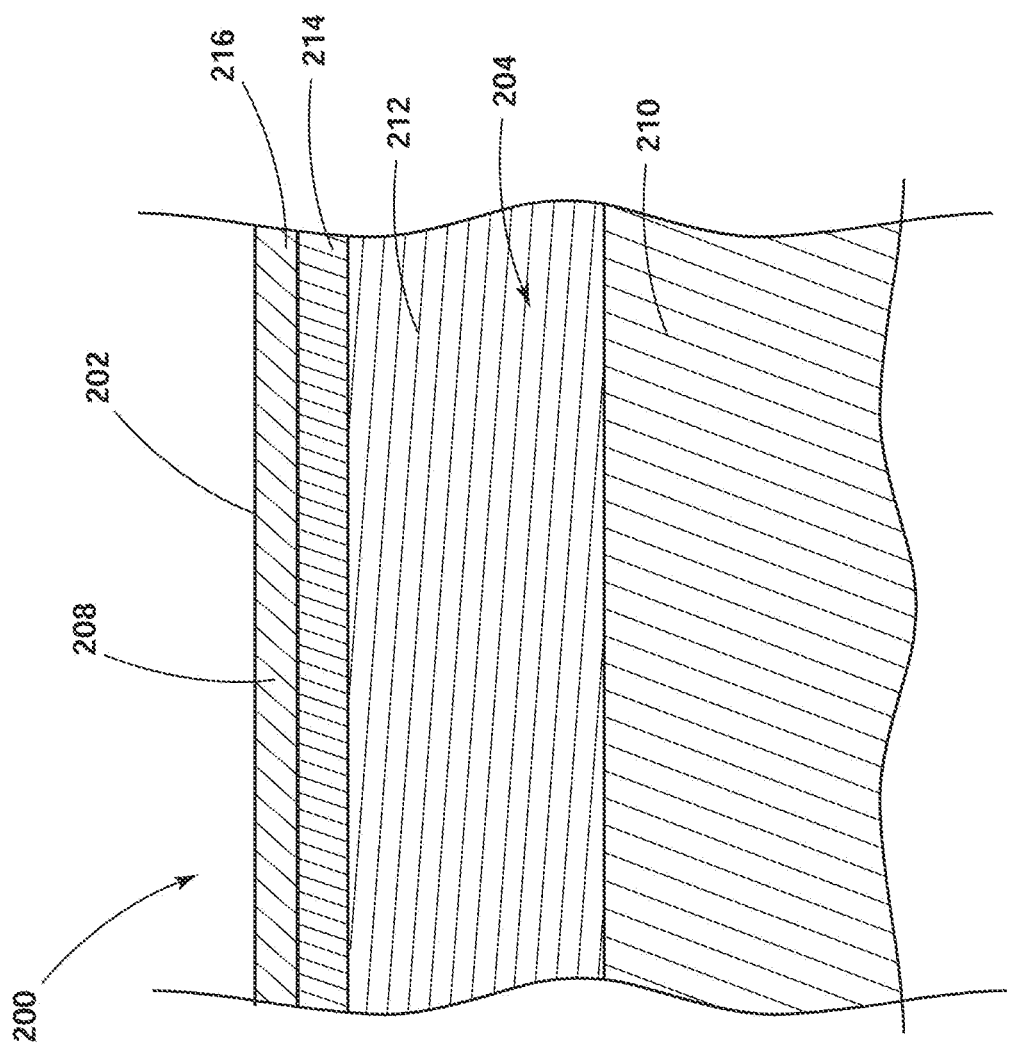
FIG. 5 is a schematic cross section of another portion of an airfoil, having a woven core, a laminate skin, a first coating, and a second coating, in accordance with an exemplary embodiment of the present disclosure.

FIG. 5 shows a portion of a sectional view of another airfoil 200 having an outer wall 202 defining an interior 204, and including a suction side 208. While shown as generally parallel, it should be understood that the outer wall 202 at the suction side 208 can be curved, similar to that shown in FIG. 3, and the section shown is schematic.

The airfoil 200 includes a woven core 210. A laminate skin 212 can be provided over the woven core 210. A first coating 214 is provided over the laminate skin 212 and a second coating 216 is provided over the first coating 214. In one example, it is contemplated that the airfoil 200 can include a plurality of coating layers or a set of coating layers, having any number of coatings provided exterior of the laminate skin 212.

The first coating 214 can be an environmental barrier coating, for example, such as polyurethane, polypropylene, or polyethylene. The second coating 216 can be another environmental barrier coating, which can be different than that of the first coating 214, thereby providing greater environmental shielding than one coating alone. Additional exterior layers are contemplated, such as an ultraviolet (UV) radiation paint layer, or adhesive layers between the first and second coatings 214, 216.

Utilizing the woven core 210 with the laminate skin 212 and the first and second coatings 214, 216 can provide for improved stiffness transition or elasticity transition between layers, where the stiffness transition or elasticity transition between the first coating 214 and the laminate skin 212 is less than the stiffness transition or elasticity transition between the second coating 216 and the laminate skin 212, or wherein the overall stiffness transition or elasticity transition, either among the woven core 210 and the second coating 216, or measured as an average change in stiffness among the woven core 210 and the layers 212, 214, 216, that is less than an average stiffness among a similar system without using the woven core 210 and the layers 212, 214, 216.

Figure 6:
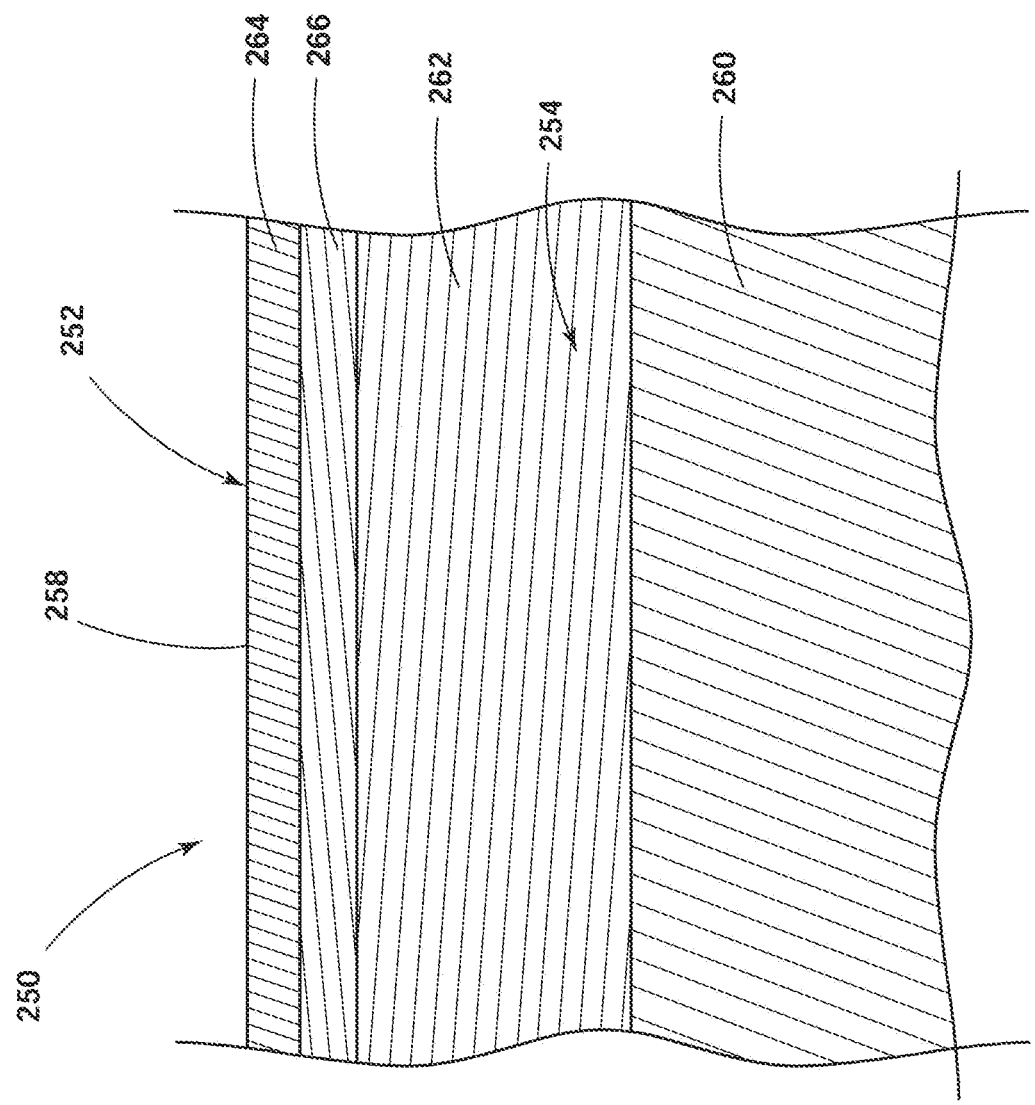
FIG. 6 is a schematic cross section of another portion of an airfoil, including a woven core, a laminate skin, an adhesive layer, and a coating, in accordance with an exemplary embodiment of the present disclosure.

FIG. 6 shows a portion of a sectional view of another airfoil 250 having an outer wall 252 defining an interior 254, and including a suction side 258. While shown as generally parallel, it should be understood that the outer wall 252 at the suction side 258 can be curved, similar to that shown in FIG. 3, and the section shown is schematic.

The airfoil 250 includes a woven core 260. A laminate skin 262 can be provided over the woven core 260. A coating 264 is provided over the laminate skin 262, and an intermediate adhesive layer 266 is provided between the coating 264 and the laminate skin 262 to facilitate adhesion of the coating 264 to the laminate skin 262.

Utilizing the woven core 260 can provide for improved stiffness or elasticity transition between the woven core 260 of the airfoil, the laminate skin 262, and the coating 264. Utilizing the intermediate adhesive layer 266 can provide for improved adhesion for the coating 264 to the laminate skin 262. Furthermore, the intermediate adhesive layer 266 can include a stiffness or elasticity that is between the coating 264 and the laminate skin 262, further facilitating the overall stiffness or elasticity transition for the airfoil 250. Therefore, the airfoil 250 can provide for an improved core structure having an improved stiffness or elasticity transition between the woven core 260 and exterior layers forming the outer wall 252 of the airfoil 250.

Figure 7:
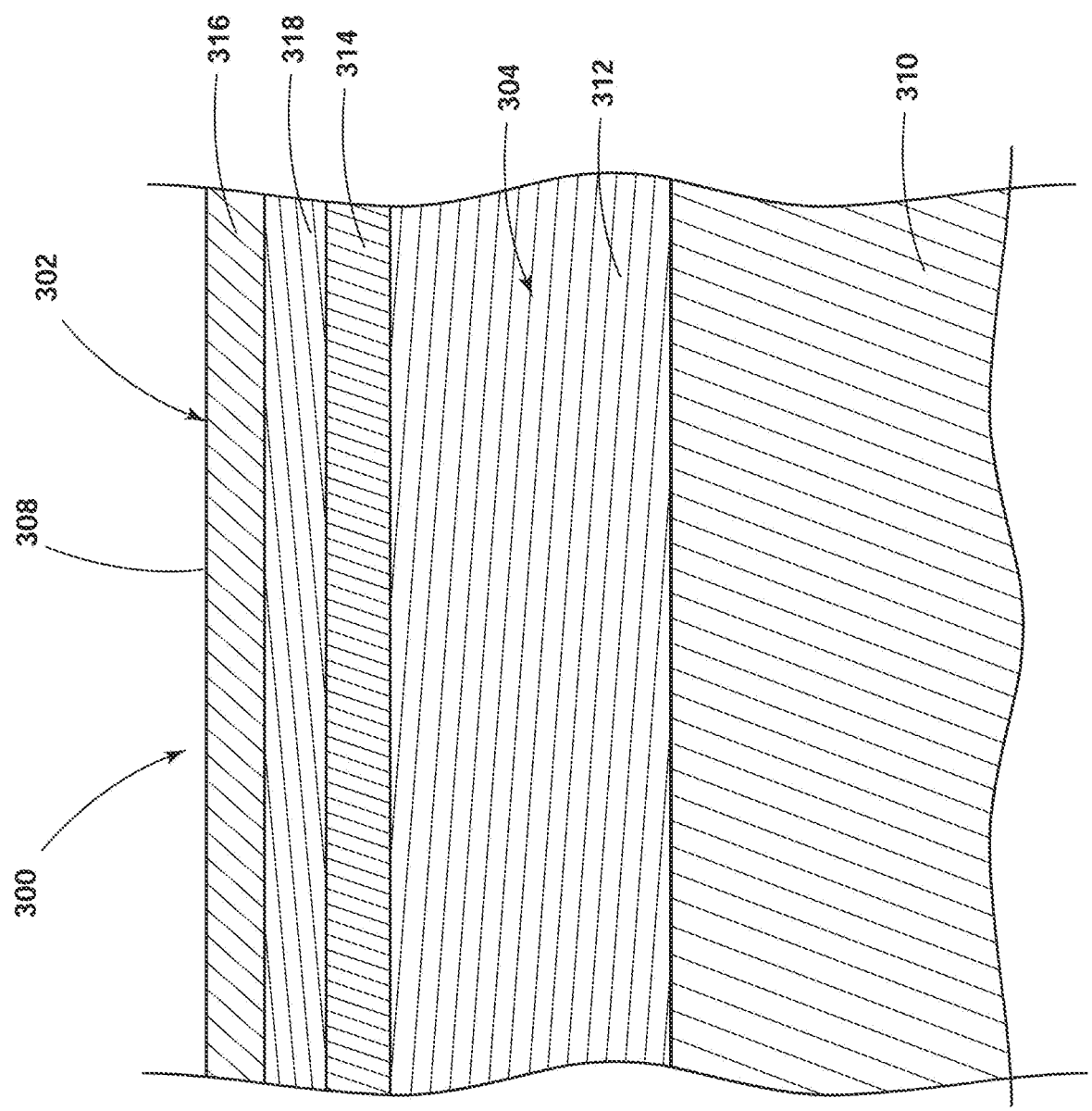
FIG. 7 is a schematic cross section of another portion of an airfoil, including a woven core, a laminate skin, a first coating, and adhesive layer, and a second coating, in accordance with an exemplary embodiment of the present disclosure.

FIG. 7 shows a portion of a sectional view of another airfoil 300 having an outer wall 302 defining an interior 304, and including a suction side 308. While shown as generally flat, it should be understood that the outer wall 302 at the suction side 308 can be curved, similar to that shown in FIG. 3, and the section as shown is schematic. The airfoil 300 includes a woven core 310. A laminate skin 312 can be provided over the woven core 310 and a first coating 314 is provided over the laminate skin 312. A second coating 316 is provided over the first coating 314. An intermediate adhesive layer 318 can be provided between the first coating 314 and the second coating 316.

The first and second coatings 314, 316 can be environmental barrier coatings, such as an oil barrier coating, an anti-ice or ice-phobic coating, or a UV radiation coating in non-limiting examples. Additionally, the first and second coatings 314, 316 can be a paint coating, while including environmental barrier properties. The stiffness or elasticity for the first and second coatings 314, 316 can be arranged such that the stiffness or elasticity transition among adjacent layers is minimized. For example, a stiffness for the first coating 314 can be nearer to the stiffness of the laminate skin 312, while the second coating 316 can include a stiffness nearer to that of the first coating 314 than that of the laminate skin 312. Furthermore, the intermediate adhesive layer 318 can include a stiffness that is between the stiffness of the first coating 314 and the second coating 316, providing for an improved stiffness or elasticity transition between the exterior layers. Such an improved stiffness or elasticity transition can increase durability of the airfoil 300, extending lifetime and reducing maintenance costs.

In alternative examples, it is contemplated that the airfoil 300 can include a plurality of coatings or a set of coatings, having an adhesive layer provided between at least some or each of the coatings.

Figure 8:
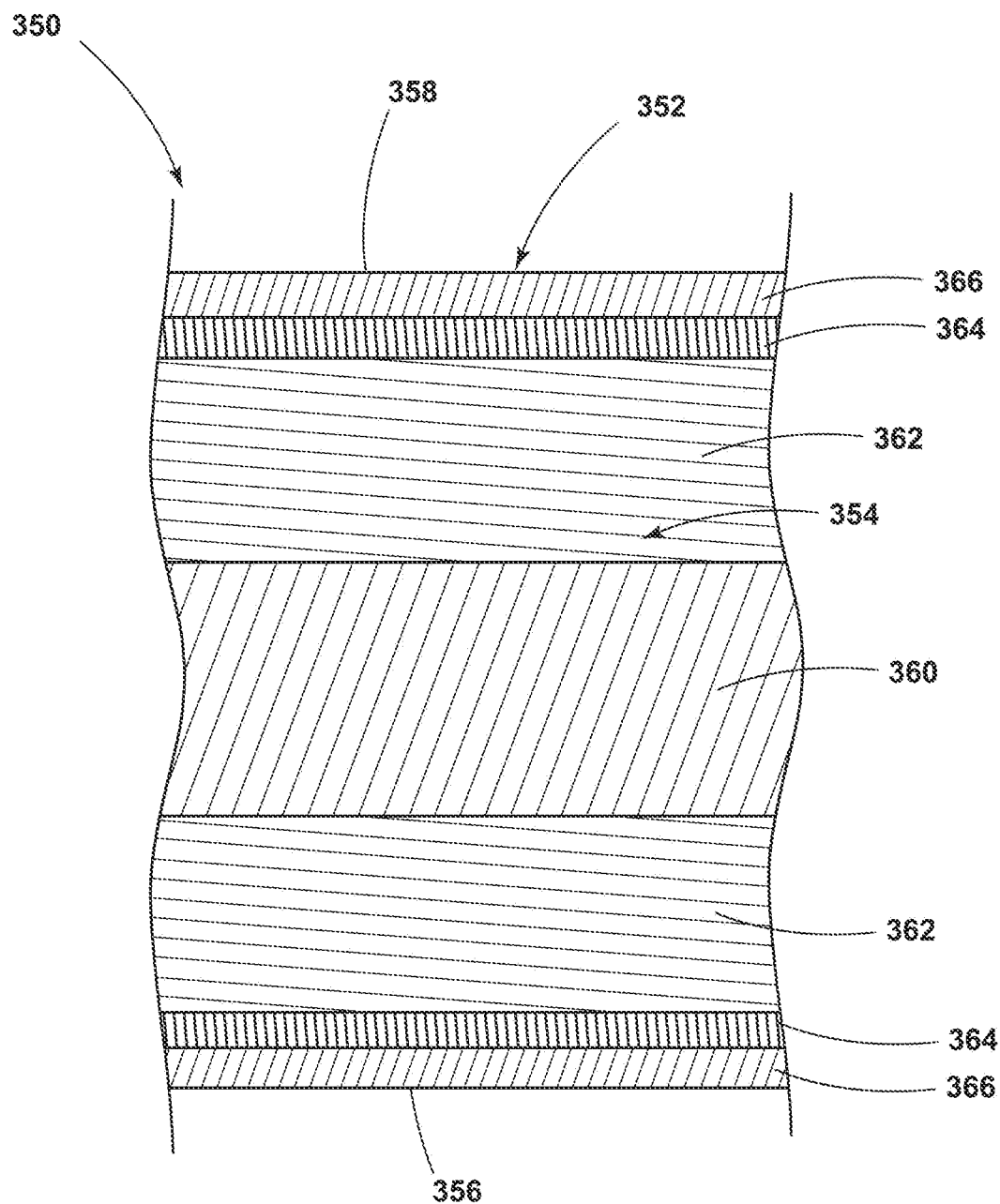
FIG. 8 is a schematic cross section of another portion of an airfoil, including a woven core, a laminate skin, a woven sheath, and an exterior coating, in accordance with an exemplary embodiment of the present disclosure.

FIG. 8 shows a portion of a sectional view of another airfoil 350 having an outer wall 352 defining an interior 354, and including a pressure side 356 and a suction side 358. While shown as flat and generally parallel to one another, it should be understood that the outer wall 352 at the pressure side 356 and suction side 358 can be curved, similar to that shown in FIG. 3, and the section shown is schematic.

The airfoil 350 includes a woven core 360. A laminate skin 362 can be provided over the woven core 360. A woven sheath or woven layer 364 is provided over the laminate skin 362, and an exterior coating 366 is provided over the woven layer 364. The woven layer 364 can includes a woven structure, such as that described herein, and can be formed by a Jacquard loom or other three-dimensional weaving machine.

The stiffness or elasticity for the woven layer 364 can be arranged such that the stiffness or elasticity transition between the laminate skin 362 and the exterior coating 366 is decreased among adjacent portions. For example, a stiffness or elasticity for woven layer 364 can be nearer to the stiffness of the laminate skin 362 than that of the woven core 360. In this way, the woven layer 364 provides for a stiffness or elasticity transition between the laminate skin 362 and any exterior layers, such as the exterior coating 366. Such an improved transition can increase durability of the airfoil 350, extending lifetime and reducing maintenance costs.

In alternative examples, the woven layer 364 and the exterior coating 366 can be formed as multiple bi-layers, a set of woven layers and a set of coating layers, in non-limiting examples. In such examples, it is contemplated that one or more intervening adhesive layers can be utilized between layers. Similar increasing or decreasing values for the stiffness or elasticity can be applied to any additional layers, such that the transition among layers can be matched nearer to adjacent layers to improve transition among multiple layers.

Figure 9:
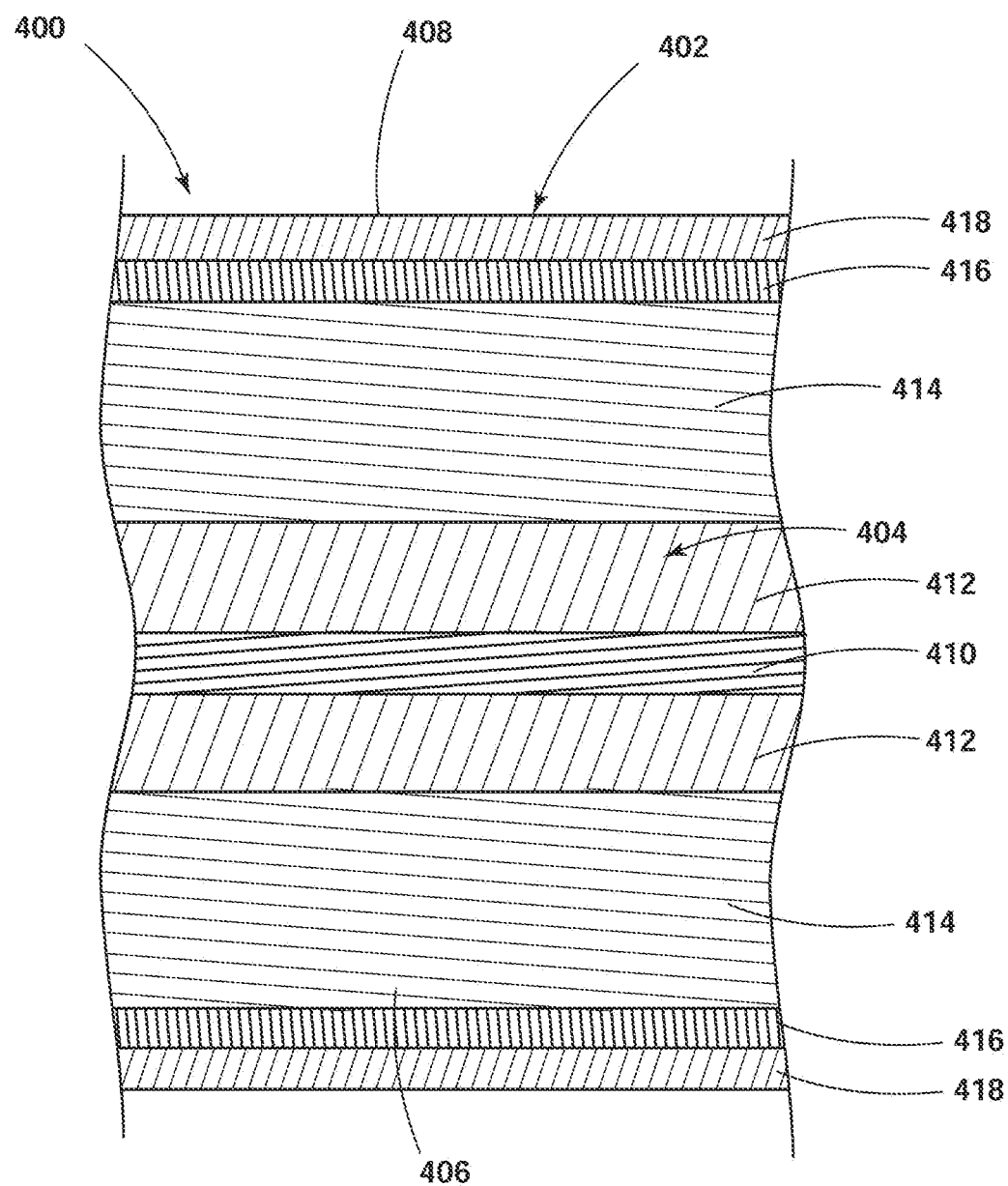
FIG. 9 is a schematic cross section of another portion of an airfoil, including a foam inner core, a woven outer core, a laminate skin, a woven sheath, and a coating, in accordance with an exemplary embodiment of the present disclosure.

FIG. 9 shows a portion of a sectional view of another airfoil 400 having an outer wall 402 defining an interior 404, and including a pressure side 406 and a suction side 408. While shown as generally parallel, it should be understood that the outer wall 402 can be curved, similar to that shown in FIG. 3, and the section as shown is schematic.

The airfoil 400 includes a foam inner core 410 and a woven outer core 412 provided over the foam inner core 410. A laminate skin 414 can be provided over the woven outer core 412. A woven sheath or woven layer 416 is provided over the laminate skin 414, and a coating layer 418 is provided over the woven layer 416.

The stiffness for the woven outer core 412 can provide for a stiffness or elasticity transition between the foam inner core 410 and the laminate skin 414. Utilizing the foam inner core 410 with the woven outer core 412 can utilize the structural benefits of the foam inner core 410, while providing an intermediate transition between the foam inner core 410 and the laminate skin 414. Furthermore, manufacture and handling of the foam inner core 410 can be facilitated with an exterior woven outer core 412 prior to resin impregnation or other finishing, facilitating manufacture. Similarly, a stiffness or elasticity for woven layer 416 can be nearer to the stiffness or elasticity of the laminate skin 414, while the coating 418 can be nearer to that of the woven layer 416 than that of the laminate skin 414. In this way, the woven layer 416 provides for a smoother transition between the laminate skin 414 and any exterior layers, such as the coating 418. Such an improved stiffness transition can increase durability of the airfoil 400, extending lifetime and reducing maintenance costs.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbine engine comprising: a fan section, a compressor section, combustor section, and turbine section in serial flow arrangement, and defining an engine longitudinal axis; and an airfoil, provided in one of the fan section, the compressor section, or the turbine section, the airfoil including an outer wall having a pressure side and a suction side, and the airfoil rotatable about the engine longitudinal axis, the airfoil comprising: a woven core having a first stiffness, a laminate skin, having a second stiffness, located exteriorly of the woven core, and a first coating, having a third stiffness, located exteriorly of the laminate skin; wherein the second stiffness is between the first stiffness and the third stiffness, providing a stiffness transition between the first stiffness and the third stiffness.

The turbine engine of any preceding clause wherein the woven core includes a three-dimensional weave pattern.

The turbine engine of any preceding clause wherein the three-dimensional weave pattern includes a braided pattern.

The turbine engine of any preceding clause wherein the first coating is an environmental barrier coating.

The turbine engine of any preceding clause wherein the first coating partially covers the laminate skin.

The turbine engine of any preceding clause further comprising an exterior coating located exteriorly of the first coating.

The turbine engine of any preceding clause further comprising an adhesive layer located between the first coating and the exterior coating.

The turbine engine of any preceding clause wherein the adhesive layer includes a stiffness that is intermediate between the third stiffness and a fourth stiffness defined by the exterior coating.

The turbine engine of any preceding clause further comprising an adhesive layer located between the laminate skin and the first coating.

The turbine engine of any preceding clause further comprising a woven layer located between the laminate skin and the first coating.

The turbine engine of any preceding clause wherein the woven layer includes a braided pattern.

The turbine engine of any preceding clause wherein the woven layer includes a different weave pattern than that of the woven core.

The turbine engine of any preceding clause further comprising a foam core located within the woven core.

An airfoil having an outer wall defining an interior, the airfoil comprising: a three-dimensional woven core; and a laminate skin located exteriorly of the three-dimensional woven core; and a three-dimensional woven layer located exteriorly of the laminate skin.

The airfoil of any preceding clause wherein the three-dimensional woven layer includes an elasticity that is greater than an elasticity for the laminate skin.

The airfoil of any preceding clause further comprising a foam core located within the three-dimensional woven core.

The airfoil of any preceding clause wherein the three-dimensional woven core includes a weave pattern that is different than another weave pattern defining the three-dimensional woven layer.

A turbine engine comprising: a fan section, a compressor section, combustor section, and turbine section in serial flow arrangement, and defining an engine longitudinal axis; and an airfoil rotatable about the engine longitudinal axis, the airfoil comprising: a woven core; a laminate skin at least partially covering the woven core; and at least one coating located exteriorly of the laminate skin.

The turbine engine of any preceding clause further comprising a woven layer located exteriorly of the laminate skin.

The turbine engine of any preceding clause wherein the at least one coating is located exteriorly of the woven layer.

The turbine engine of any preceding clause wherein the woven core is dry.

The turbine engine of any preceding clause wherein the woven core is impregnated with a resin and cured.

The turbine engine of any preceding clause wherein the woven core is made from the same material as the laminate skin.

The turbine engine of any preceding clause wherein the woven core is made from a different material than the laminate skin.

The turbine engine of any preceding clause wherein the laminate skin is pre-impregnated.

The turbine engine of any preceding clause wherein the laminate skin is a fiber placed or dry fiber coating.

The turbine engine of any preceding clause wherein the at least one coating includes at least one of an adhesive, a paint coating, polyurethane, polypropylene, or polyethylene.

The turbine engine of any preceding clause wherein the at least one coating is an environmental barrier coating.

The turbine engine of any preceding clause wherein the environmental barrier coating is one of an oil barrier coating, an anti-ice coating, or an ultraviolet (UV) radiation coating.

The turbine engine of any preceding clause wherein the woven core is formed as a preform, and the laminate skin is applied to the preform.

The turbine engine of any preceding clause wherein the at least one coating is provided as a polyurethane base layer and an exterior paint layer provided on the polyurethan base layer.

The turbine engine of any preceding clause wherein the at least one coating is provided as a polypropylene base layer and an exterior polyurethane layer provided on the polypropylene base layer.

The turbine engine of any preceding clause further comprising a paint layer provided on the exterior polyurethan layer.

The turbine engine of any preceding clause wherein the at last one coating further includes multiple layers, with a first layer comprising an adhesive layer, and at least one exterior layer provided on the adhesive layer.

The turbine engine of any preceding clause wherein the at least one exterior layer is a polypropylene layer.

The turbine engine of any preceding clause wherein the woven core and the laminate skin are formed as a composite preform.

What is claimed is:

1. A turbine engine comprising:
   a fan section, a compressor section, a combustor section, and a turbine section in serial flow arrangement, and defining an engine centerline; and
   an airfoil, provided in one of the fan section, the compressor section, or the turbine section, the airfoil including an outer wall having a pressure side and a suction side, and the airfoil rotatable about the engine centerline, the airfoil comprising:
   a woven core having a first stiffness,
   a laminate skin, having a second stiffness and located exteriorly of the woven core,
   a first coating, having a third stiffness and located exteriorly of the laminate skin,
   wherein the second stiffness is between the first stiffness and the third stiffness, providing a stiffness transition from the first stiffness to the third stiffness,
   a second coating located exteriorly of the first coating, and
   an adhesive layer provided between the first coating and the second coating.

2. The turbine engine of claim 1 wherein the woven core includes a three-dimensional weave pattern.

3. The turbine engine of claim 2 wherein the three-dimensional weave pattern includes a braided pattern.

4. The turbine engine of claim 1 wherein the first coating is an environmental barrier coating.

5. The turbine engine of claim 1 wherein the first coating partially covers the laminate skin.

6. The turbine engine of claim 1 further comprising a second adhesive layer located between the laminate skin and the first coating.

7. The turbine engine of claim 1 further comprising a woven layer located between the laminate skin and the first coating.

8. The turbine engine of claim 7 wherein the woven layer includes a braided pattern.

9. The turbine engine of claim 7 wherein the woven layer includes a different weave pattern than that of the woven core.

10. The turbine engine of claim 1 further comprising a foam core located within the woven core.

11. The turbine engine of claim 1 wherein the second coating includes a fourth stiffness, and wherein a fifth stiffness for the adhesive layer is between the third stiffness and the fourth stiffness.

12. The turbine engine of claim 1, wherein the second coating is an ultraviolet radiation layer.

13. An airfoil having an outer wall defining an interior, the airfoil comprising:
   a three-dimensional woven core having a first stiffness; and
   a laminate skin having a second stiffness and located exteriorly of the three-dimensional woven core;
   a first coating having a third stiffness and located exteriorly of the laminate skin;
   a second coating having a fifth stiffness and located exteriorly of the first coating; and
   an adhesive layer having a fourth stiffness and provided between the first coating and the second coating;
   wherein the second stiffness of the laminate skin is between the first stiffness of the three-dimensional woven core and the third stiffness of the first coating; and wherein the fourth stiffness of the adhesive layer is between the third stiffness of the first coating and the fifth stiffness of the second coating.

14. The airfoil of claim 13 further comprising a three-dimensional woven layer located exteriorly of the laminate skin, and wherein the three-dimensional woven layer includes an elasticity that is greater than an elasticity for the laminate skin.

15. The airfoil of claim 14 wherein the three-dimensional woven core includes a weave pattern that is different than another weave pattern defining the three-dimensional woven layer.

16. The airfoil of claim 13 further comprising a foam inner core located within the three-dimensional woven core.

17. A turbine engine comprising:
- a fan section, a compressor section, a combustor section, and a turbine section in serial flow arrangement, and defining an engine longitudinal axis; and
- an airfoil rotatable about the engine longitudinal axis, the airfoil comprising:
  - a woven core;
  - a laminate skin at least partially covering the woven core;
  - at least two coatings located exteriorly of the laminate skin including at least a first coating having a first stiffness and a second coating having a second stiffness; and
  - an adhesive layer provided between the first coating and the second coating;
  - wherein a third stiffness for the adhesive layer is between the first stiffness for the first coating and the second stiffness for the second coating.

18. The turbine engine of claim 17 further comprising a woven layer located exteriorly of the laminate skin.

* * * * *